United States Patent [19]

Stephenson et al.

[11] 4,419,012
[45] Dec. 6, 1983

[54] POSITION MEASURING SYSTEM

[75] Inventors: Michael D. Stephenson, Dole; Winston A. Waller, Whitstable, both of England

[73] Assignee: Elliott Brothers (London) Limited, Chelmsford, England

[21] Appl. No.: 183,805

[22] Filed: Sep. 3, 1980

[30] Foreign Application Priority Data

Sep. 11, 1979 [GB] United Kingdom ................ 7931493

[51] Int. Cl.³ ...................... G01B 11/26; H01J 40/14
[52] U.S. Cl. ................................ 356/141; 250/214 B
[58] Field of Search ............... 354/25 R, 31 F; 356/1, 356/4, 141, 152; 250/214 B

[56] References Cited

U.S. PATENT DOCUMENTS

| | | | |
|---|---|---|---|
| 4,092,072 | 5/1978 | Ellis | 356/152 |
| 4,111,555 | 9/1978 | Ellis | 356/141 |
| 4,168,123 | 9/1979 | Price | 356/152 |
| 4,171,155 | 10/1979 | Jyojiki et al. | 354/31 F |
| 4,298,258 | 11/1981 | Matsuda et al. | 354/25 |

Primary Examiner—S. C. Buczinski
Attorney, Agent, or Firm—Kirschstein, Kirschstein, Ottinger & Cobrin

[57] ABSTRACT

A position measuring system comprising a transmitter (5, 19) mounted on one body and arranged to direct a flashing beam of radiation onto an area sensor (11) which is mounted on the other body and forms part of a receiver arranged to produce an output indicative of the position of impingement of the beam on the sensor from samples of the radiation impinging on the sensor when the beam is on and off, the receiver including a second sensor (31) responsive to the radiation beam whose output synchronizes the operation of the receiver to the flashing beam. The requirement for a physical connection between receiver and transmitter to synchronize the receiver with the flashing beam is thereby avoided.

5 Claims, 4 Drawing Figures

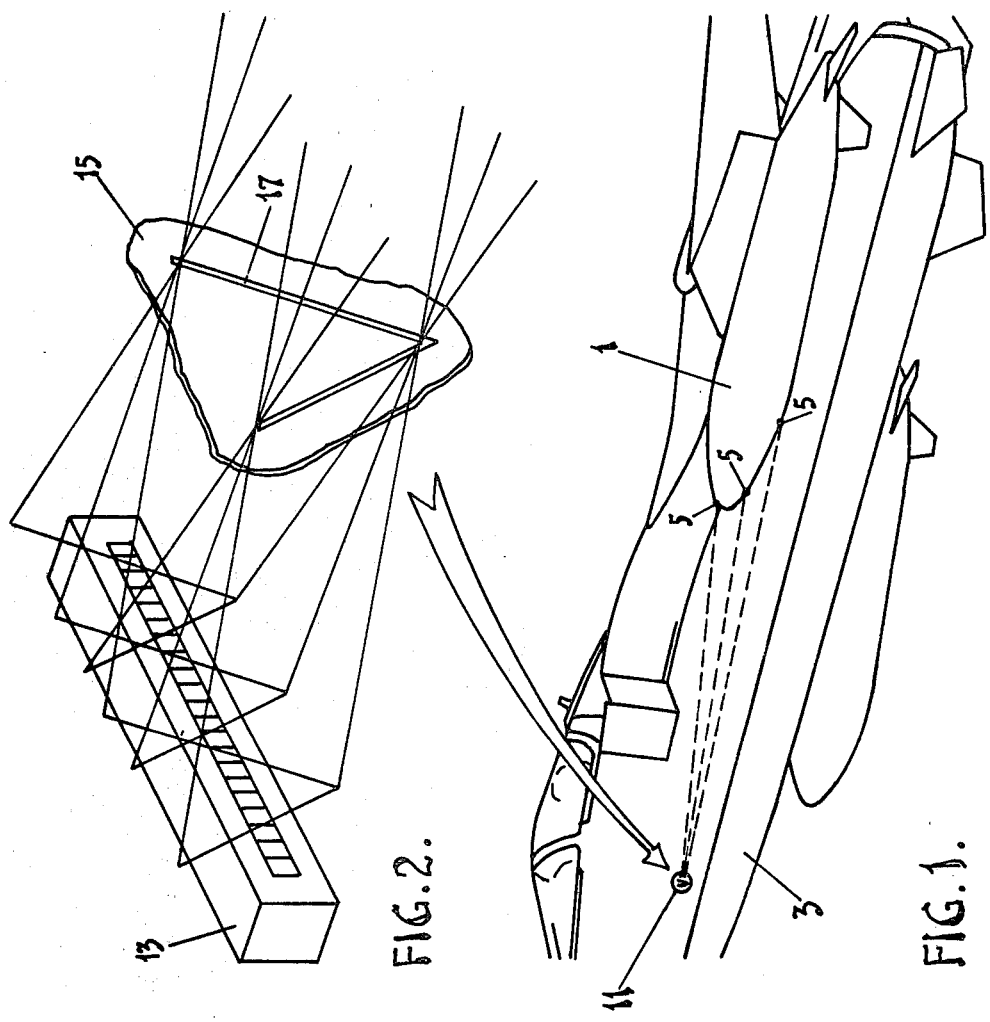

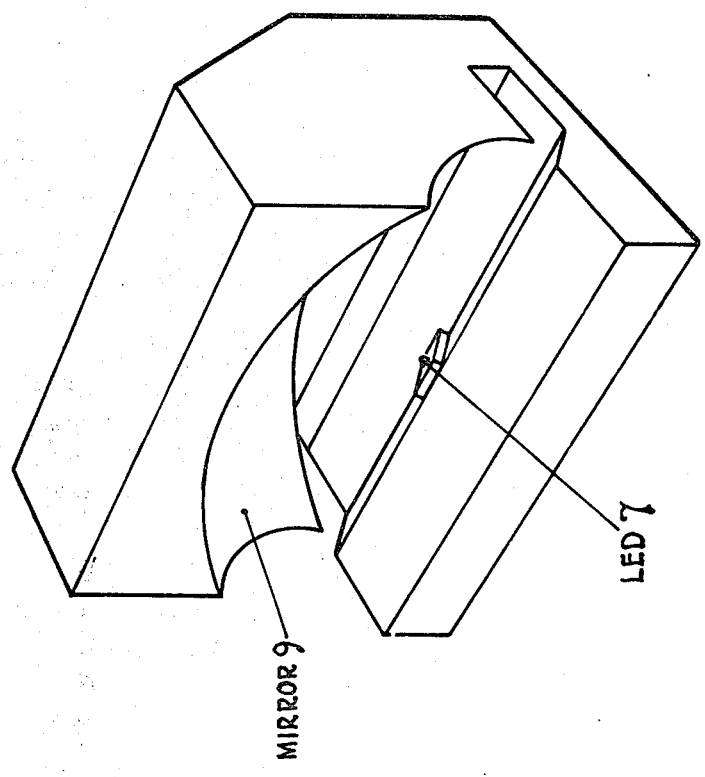

POSITION MEASURING SYSTEM

This invention relates to systems for measuring the position of one body with respect to another.

The invention relates particularly to such systems of the kind comprising a transmitter mounted on one body and arranged to direct a beam of radiation onto an area sensor which is mounted on the other body and forms part of a receiver arranged to produce an output indicative of the position of impingement of the beam on the sensor.

In such a system the radiation beam is sometimes repeatedly turned on and off and outputs respectively produced by the sensor while the beam is on and off are subtracted from one another to overcome the effect of signals produced at the sensor by spurious radiation sources e.g. where the radiation is visible light or infra red radiation, by sunlight. In such a system it is necessary for the receiver and transmitter to operate in synchronism, and this necessitates a physical connection between the two bodies which may be difficult to provide in some applications.

It is an object of the present invention to provide a system of the kind specified wherein this difficulty is overcome.

According to the present invention a system of the kind specified wherein the transmitter includes means for repeatedly turning the radiation beam on and off and the receiver is arranged to produce said output from a signal representative of the difference between successive samples of the radiation impinging on the sensor, and the receiver includes a second sensor responsive to the radiation beam and means utilising the output of the second sensor to control the receiver so that said successive samples respectively relate to times when the radiation beam is on and off, or vice versa.

One system in accordance with the invention will now be described, by way of example, with reference to the accompanying drawings in which:

FIGS. 1 and 2 illustrate the general arrangement of the system;

FIG. 4 shows a radiation source used in the system transmitter.

Figure 3:
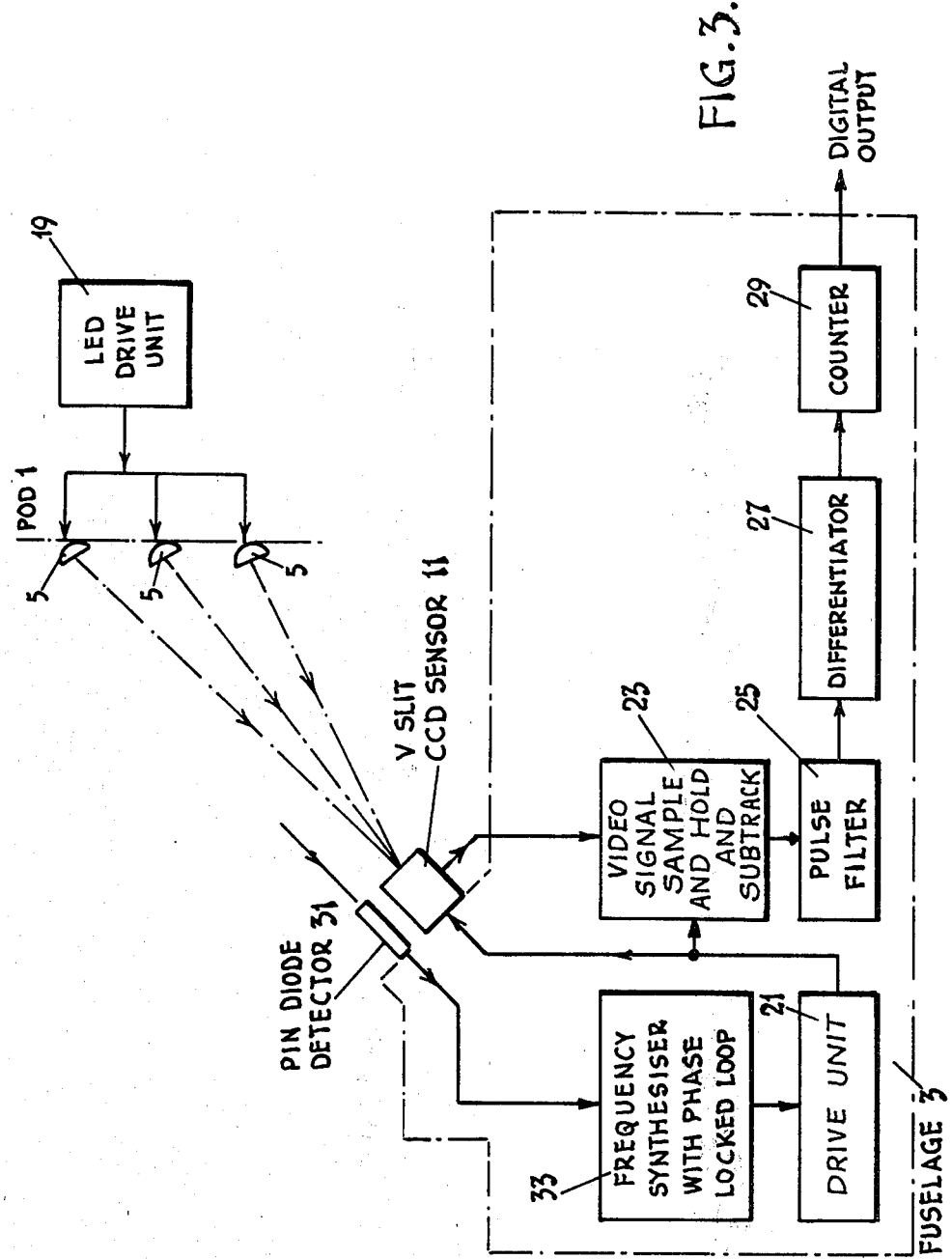
FIG. 3 is a block schematic diagram of a receiver and transmitter used in the system.

Referring to FIG. 1, the system provides a measurement of the orientation of an aircraft wing mounted pod 1 with reference to the aircraft fuselage 3.

Due to flexing and bending of the aircraft wing the orientation of the pod with respect to the fuselage can vary considerably so that if the pod houses equipment such as a forward looking infra red television camera forming part of a weapon aiming system, the orientation of the pod with respect to the fuselage needs to be accurately known.

The measurement system includes a transmitter incorporating three light emitting diode (LED) infra red radiation beam sources 5 mounted on the pod 1. As shown in FIG. 4, each source 5 comprises a LED 7 mounted at the principal focus of a parabolic mirror 9 angled to the LED 7 so that the full solid angle of radiation from each LED 7 is incident on the associated mirror 9. The reflected radiation from the mirror 9 of each source 5 forms a collimated beam directed onto a sensor 11 incorporated in a receiver mounted on the aircraft fuselage 3.

As shown in FIG. 2, the sensor 11 comprises an infra-red sensitive charge coupled device 13 and an infra red opaque plate 15 having a V-shaped slit 17 and positioned adjacent the CCD 13 in the path of the beams from the sources 5. Six LED images are thus projected onto the CCD 13 at positions depending on the orientation of the pod 1 relative to the fuselage 3.

Referring now to FIG. 3 the LEDs 7 are energised from a drive unit 19 so that the LEDs 7 are repeatedly turned on and off in synchronism for regular periods.

In the receiver the CCD 13 is controlled by a drive unit 21 so that the CCD stored charge pattern is read out once during each period the LEDs 7 are on and once during each period the LEDs 7 are off. Successive read outs thus relate alternately to radiation projected onto the CCD 13 from the LEDs 7 plus radiation from any spurious sources e.g. the sun, and to radiation from such spurious sources alone. The read outs from the CCD 13 are passed to sample and hold circuitry 23 where successive readouts are subtracted from previous readouts to give an output relating only to the radiation projected onto the CCD 13 from the LEDs 7.

The output of the circuitry 23 is fed via a low pass filter 25 to a differentiator 27. The zero crossings in the differentiator output are then detected and a free-running counter 29 which is reset at appropriate times relative to the CCD read out periods provides six numbers representing its count at the zero crossing instants, and hence representative of the positions of the six LED images on the CCD 13. The orientation of the pod 1 is calculated from these numbers by a digital computer (not shown).

It will be appreciated that for satisfactory operation the storage and read out periods of the CCD 13 must be synchronised with the turning on and off of the LEDs 7.

To this end the receiver includes a second infra red sensor in the form of a PIN diode 31 on which the beam from at least one of the sources 5 impinges. The pulse output of the diode 31 is fed to a frequency synthesiser 33 comprising a phase locked loop which is operated as a frequency multiplier. The frequency of the output of the synthesiser 31, which is utilised to provide a master clock signal for the CCD drive unit 21, is thus an exact predetermined multiple of the flashing frequency of the LEDs 7 despite any variation in the flashing frequency.

It will be appreciated that many modifications of the receiver are possible. For example, the subtraction to remove the effect of spurious radiation may be effected in the CCD itself by feeding the CCD read out obtained with the LEDs off through an inverting amplifier back into the CCD. A negative charge pattern corresponding to the spurious radiation image is thus stored in the CCD which cancels the charge pattern corresponding to the spurious radiation image obtained with the LEDs on so that the next CCD read out corresponds to the image produced by LED radiation only.

If desired a low bandwidth data channel from the pod 1 may be provided by modulating the LED signals, the receiver being provided with appropriate demodulation means. Either amplitude modulation or some form of modulation of pedestal pulses on the main pulses might be used. In the latter case the data pulses would be removed from the PIN diode output before being utilised by the frequency synthesiser 31.

We claim:

1. A system for measuring the position of one body with respect to another body, said system comprising a transmitter, an area sensor mounted on said one body, means to mount said transmitter on said other body in a position such as to direct a beam of radiation from said transmitter onto said area sensor, said area sensor forming part of a receiver arranged to produce an output indicative of the position of impingement of the beam on the sensor: wherein the transmitter includes means operative independently of the receiver for repeatedly turning the radiation beam on and off and the receiver includes means for subtracting alternate outputs produced by the sensor from immediately preceding previous outputs produced by the sensor, and wherein the receiver includes a second sensor responsive to the radiation beam, and means utilizing the output of the second sensor to control the receiver so that the subtraction is successively performed when the radiation beam is on and when the radiation beam is off, and the output of the subtracting means relates only to radiation in said beam and not to spurious radiation.

2. A system according to claim 1 wherein the area sensor comprises an array of sensors responsive to the radiation transmitted by the transmitter, and means for repeatedly scanning the outputs of the array of sensors, and the output of the second sensor is utilised to control the frequency of a clock signal which is utilised to control the scanning rate of the area sensor.

3. A system according to claim 3 wherein the clock signal is generated by a frequency synthesiser comprising a phase locked loop operated as a frequency multiplier.

4. A system according to claim 2 wherein said area sensor is a charge coupled device.

5. A system according to claim 1 wherein said second sensor is a PIN diode.

* * * * *